(12) United States Patent
Auger

(10) Patent No.: US 10,353,089 B2
(45) Date of Patent: Jul. 16, 2019

(54) SYSTEM FOR AUTOMATICALLY LOCATING MICROSEISMIC EVENTS

(71) Applicant: Emmanuel Auger, Sainte-Tulle (FR)

(72) Inventor: Emmanuel Auger, Sainte-Tulle (FR)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 291 days.

(21) Appl. No.: 15/249,028

(22) Filed: Aug. 26, 2016

(65) Prior Publication Data

US 2018/0059272 A1 Mar. 1, 2018

(51) Int. Cl.
*G01V 1/28* (2006.01)
*E21B 43/16* (2006.01)
(Continued)

(52) U.S. Cl.
CPC ............. *G01V 1/288* (2013.01); *E21B 43/16* (2013.01); *E21B 49/00* (2013.01); *G01V 1/22* (2013.01); *G01V 1/308* (2013.01); *G01V 1/42* (2013.01); *G01V 2210/1234* (2013.01); *G01V 2210/1299* (2013.01); *G01V 2210/1425* (2013.01); *G01V 2210/1429* (2013.01); *G01V 2210/6122* (2013.01); *G01V 2210/646* (2013.01)

(58) Field of Classification Search
CPC . G01V 2210/6122; G01V 1/288; G01V 1/308
See application file for complete search history.

(56) References Cited

U.S. PATENT DOCUMENTS

2008/0112263 A1 5/2008 Bergery
2008/0285385 A1 11/2008 Cheery
(Continued)

FOREIGN PATENT DOCUMENTS

WO 2015083000 A2 6/2015

OTHER PUBLICATIONS

International Search Report and the Written Opinion of the International Searching Authority; International Application No. PCT/US2017/047966; Korean Intellectual Property Office; dated Nov. 30, 2017; 17 pages.
(Continued)

*Primary Examiner* — Hovhannes Baghdasaryan
(74) *Attorney, Agent, or Firm* — Cantor Colburn LLP

(57) ABSTRACT

A method for developing or maintaining a subterranean field includes: parameterizing seismic wave records for each identified seismic event to provide a parameter describing each seismic wave record used to identify each seismic event; generating a reference seismic event data base having the identified seismic events and the parameter; calculating a similarity value for new received seismic wave records with respect to each seismic event in the reference seismic event data base using the corresponding parameter to provide a plurality of similarity values; identifying a maximum similarity value from any of the similarity values in the plurality of similarity values that meets or exceeds a similarity threshold value; identifying a new seismic event at a location of the seismic event in the reference seismic event data base corresponding to the maximum similarity value; and modifying operation of subterranean field-related equipment in response to identifying the new seismic event.

15 Claims, 5 Drawing Sheets

(51) Int. Cl.
  *E21B 49/00*   (2006.01)
  *G01V 1/22*   (2006.01)
  *G01V 1/30*   (2006.01)
  *G01V 1/42*   (2006.01)

(56) References Cited

U.S. PATENT DOCUMENTS

| | | | |
|---|---|---|---|
| 2010/0096125 A1* | 4/2010 | Beasley | E21B 43/26 166/254.1 |
| 2014/0083681 A1 | 3/2014 | Taylor | |
| 2014/0372094 A1 | 12/2014 | Holland et al. | |
| 2015/0316666 A1* | 11/2015 | Beroza | G01V 1/008 702/15 |

OTHER PUBLICATIONS

Caffagni, et al.; "Detection and Location of Small Microseismic Events Using a Matched Filtering Algorithm (MFA)"; GeoConvention 2015; New Horizons; 5 pages.

\* cited by examiner

SYSTEM FOR AUTOMATICALLY LOCATING MICROSEISMIC EVENTS

BACKGROUND

Earth formations are used for various purposes such as hydrocarbon storage. Seismic events such as microseismic events which may occur in an earth formation are monitored to better understand the subsurface structure of the formation and to monitor the integrity of the hydrocarbon storages. Improved knowledge of the subsurface structure can lead to improved development or maintenance of the formation by taking actions to limit or prevent damage that may occur in the formation. When storing hydrocarbons, monitoring the seismicity is a way to monitor the integrity of the caverns used for storage. Typically, microseismicity monitoring relies on analysis performed by a human operator. Unfortunately, it can take as much a half a day or more before the results of the analysis are presented to the operator of the hydrocarbon storage site. In this interval, continued operation after a microseismic event occurs may result in damage to the formation or the caverns used for storage. Hence, it would be well received hydrocarbon storage industry if apparatuses and methods would be developed to automatically acquire and analyze seismic data and present analysis results to a user in real time.

BRIEF SUMMARY

Disclosed is a method for developing or maintaining a subterranean field. The method includes: receiving seismic wave records using a processor, the seismic wave records comprising information that identifies seismic events and a location and magnitude of each identified seismic event; parameterizing the seismic wave records for each identified seismic event to provide a parameter describing each seismic wave record used to identify each seismic event using the processor; generating a reference seismic event data base comprising the identified seismic events and the parameter corresponding to each seismic wave record used to identify each seismic event using the processor; calculating, using the processor, a similarity value for new received seismic wave records with respect to each seismic event in the reference seismic event data base using the corresponding parameter to provide a plurality of similarity values, each similarity value representing a level of similarity between the new seismic wave records and one of the seismic events in the reference seismic event data base; identifying a maximum similarity value from any of the similarity values in the plurality of similarity values that meets or exceeds a similarity threshold value using the processor; identifying a new seismic event at a location of the seismic event in the reference seismic event data base corresponding to the maximum similarity value using the processor; and modifying operation of equipment for developing or maintaining the subterranean field in response to identifying the new seismic event.

Also disclosed is an apparatus for developing or maintaining a subterranean field. The apparatus includes: an array of seismic receivers configured to sense seismic waves traveling through the subterranean field to provide seismic wave records comprising information that identifies seismic events and a location and magnitude of each identified seismic event; and a processor. The processor is configured to: receive the seismic wave records; parameterize the seismic wave records for each identified seismic event to provide a parameter describing each seismic wave record used to identify each seismic event; generate a reference seismic event data base comprising the identified seismic events and the parameter corresponding to each seismic wave record used to identify each seismic event; sense new seismic waves traveling through the subterranean field using the array of seismic receivers to provide new seismic wave records; receive the new seismic wave records; calculate a similarity value for new received seismic wave records with respect to each seismic event in the reference seismic event data base using the corresponding parameter to provide a plurality of similarity values, each similarity value representing a level of similarity between the new seismic wave records and one of the seismic events in the reference seismic event data base; identify a maximum similarity value from any of the similarity values in the plurality of similarity values that meets or exceeds a similarity threshold value; identify a new seismic event at a location of the seismic event in the reference seismic event data base corresponding to the maximum similarity value; and transmit a signal to a user interface in response to identification of the new seismic event using the processor, the signal comprising notification that the new seismic event has been identified. The apparatus further includes equipment configured to have modified operation in order to develop or maintain the earth formation in response to identification of the new seismic event.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method is presented herein by way of exemplification and not limitation with reference to the figures.

Disclosed are embodiments of apparatuses and methods for developing or maintaining an earth formation or a hydrocarbon storage facility in the earth formation in response to characterizing seismic events in the formation in real time. The seismic events are characterized by receiving seismic waves traveling through the earth formation. The seismic waves are received over a period of time and are used to determine locations and magnitudes of seismic events. Because processing individual traces of the received seismic waves for each seismic event can consume a very large amount of processing power and thus processing time, seismic waves or records of such for each seismic event are parameterized to produce a short list of parameters that are representative of the seismic waves caused by the associated seismic event. The short list of parameters enables very quick processing of new seismic records in real time. The seismic events and the associated locations and parameters are used to generate a seismic event data base.

When new seismic waves or records are received after establishment of the seismic event data base, the seismic waves are compared to each of the seismic events in the seismic event data base (i.e., prior seismic events), using the concise parametrization of the prior seismic events. A level of similarity is calculated that represents how similar the new seismic waves are to each of the seismic events in the seismic event data base. New seismic waves with zero or low similarity to any of the prior seismic events may not be caused by a seismic event, but rather by some extraneous event such as a pump being turned on. New seismic waves with similarity above a threshold level are likely to have been caused by a seismic event. New seismic waves having a maximum similarity to one of the prior seismic events are most likely to have been caused by a seismic event that occurred at the same location as the prior seismic event having the maximum similarity to the new seismic waves. Using data associated with the new seismic waves and the parameters associated with the prior seismic event having maximum similarity, a magnitude of the new seismic event can be calculated.

When a new seismic event has been identified, a signal may be transmitted to a user interface informing the user that the new seismic event has been identified along with the location and magnitude of the new seismic event. Upon receiving the signal, the user may take action by modifying operation of equipment to prevent or limit damage to the formation or the cavern.

Figure 1:
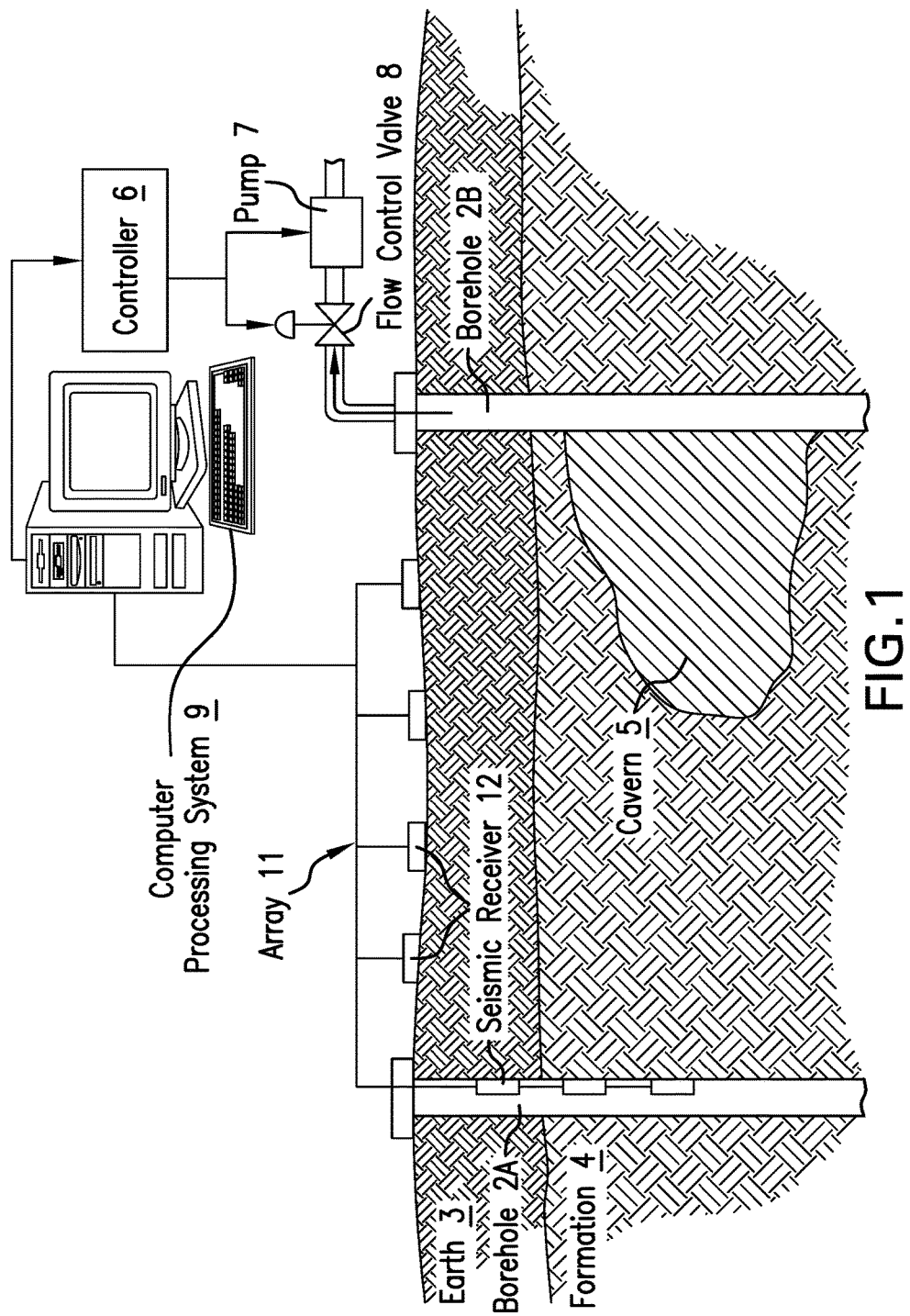
FIG. 1 is a cross-sectional view of a borehole penetrating a cavern in the earth and equipment for injecting and producing fluids from the cavern, and for monitoring the seismicity around the cavern.

FIG. 1 illustrates apparatus for implementing the methods disclosed herein. In FIG. 1, a first borehole 2A and a second borehole 2B penetrate the earth 3 having a formation 4. The formation 4 represents any subterranean field or subsurface material of interest. A seismic array 11 may include seismic receivers 12 disposed at the surface of the earth 3 and/or downhole. The seismic receivers 12 are configured to convert seismic waves traveling through the formation 4 into electrical signals. The electrical signals generally in the form of seismic traces (i.e., amplitude of received wave over time) are processed and recorded by a surface computer processing system 9. By processing the electrical signals, the location of each seismic event that may have caused the seismic waves may be estimated using processing techniques such as triangulation. In addition, a magnitude of each seismic event may be estimated using the amplitudes of the electrical signals.

In one or more embodiments, developing the formation 4 may include creating a subterranean cavern (or cavity) 5 that may be used to store hydrocarbons such as gas or oil. The cavern 5 may be created in any of various ways known in the art. In general, caverns are elongated in the vertical direction, similar to a vertical cylinder. Once the cavern has been created, pump 7 is used to either inject hydrocarbons into the cavity (storage) or pump them out (production). The repeated cycles of injection and production may weaken the cavity walls that may start collapsing. Before and during such collapses, microseismic events are created. Once the seismicity is correctly detected and positioned, actions can be taken to limit or prevent more damage. Such actions may include decreasing the flow rate of injected and/or removed fluid or stopping fluid flow altogether either automatically or manually. These actions may be performed by a controller 6 configured to control the pump 7 and/or flow control valve 8.

Figure 2A:
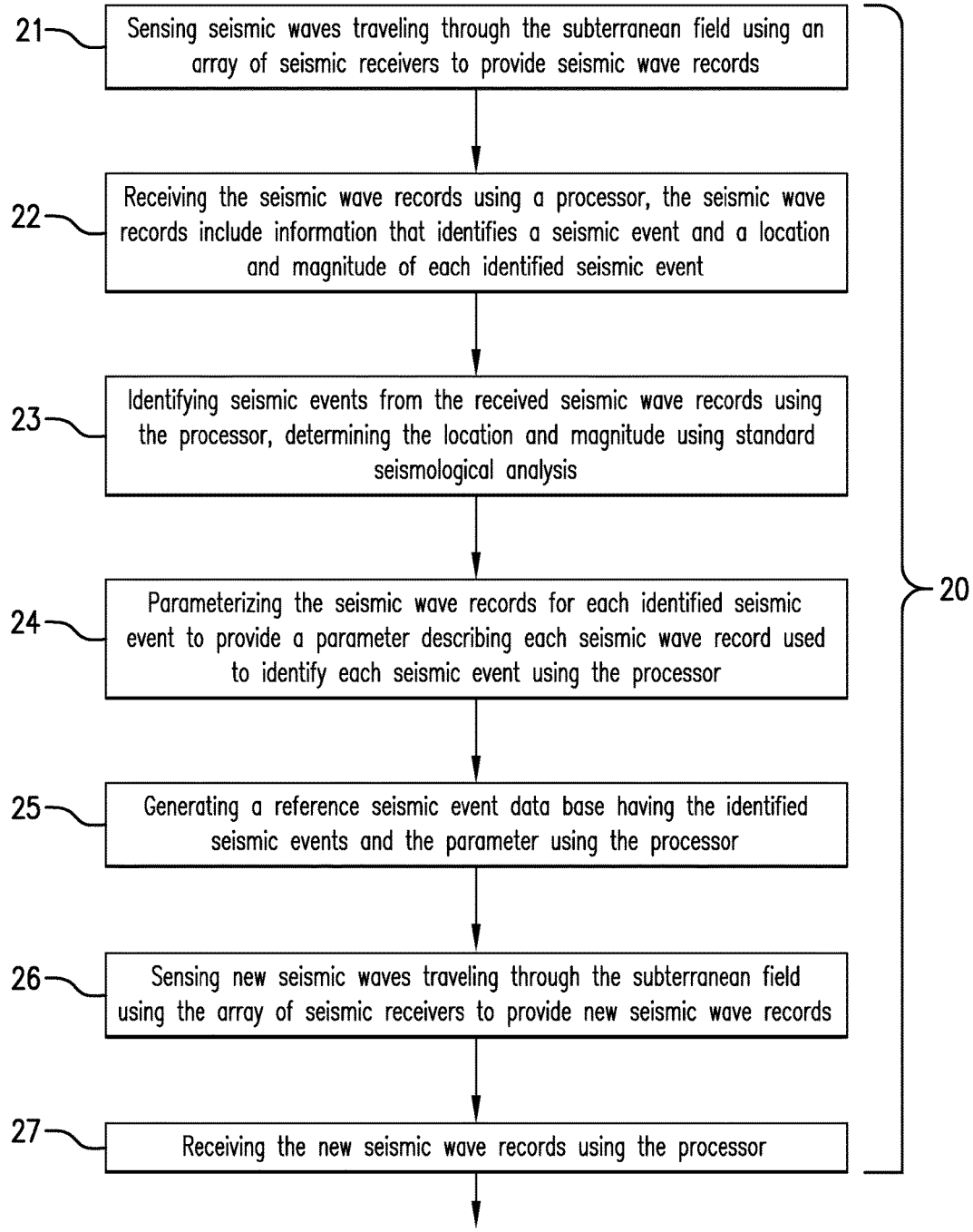
FIGS. 2A and 2B, collectively referred to as FIG. 2, present a flow chart for a method for automatically monitoring the seismicity inside the cavern.
Figure 2B:
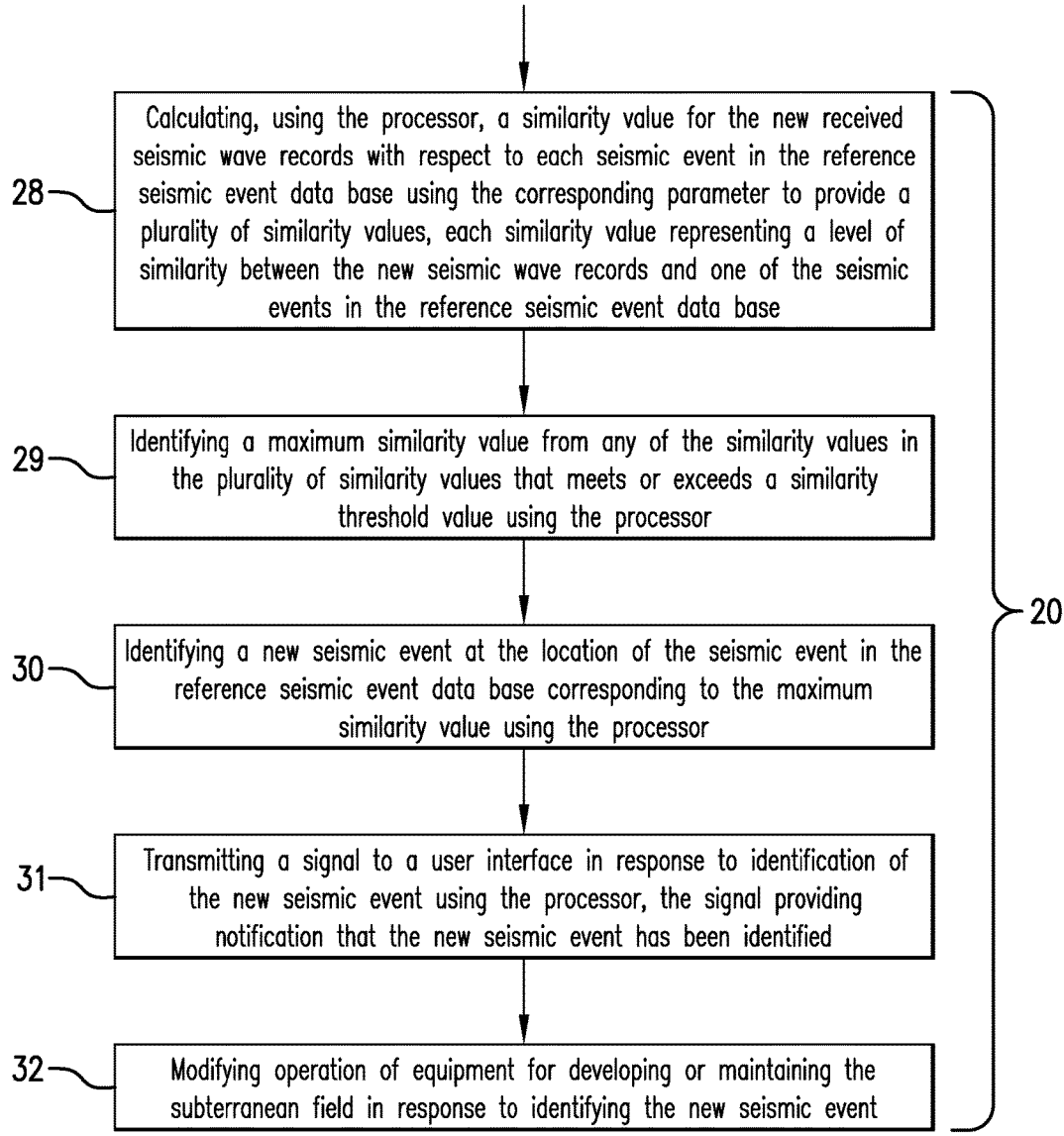

FIG. 2 is a flow chart for a method 20 for developing or maintaining a subterranean field. In one or more embodiments, maintaining a subterranean field includes maintaining a subterranean hydrocarbon storage cavern or facility. Block 21 calls for sensing seismic waves traveling through the subterranean field using an array of seismic receivers to provide seismic wave records. Block 22 calls for receiving the seismic wave records using a processor, the seismic wave records include information that identifies seismic events and a location and magnitude of each identified seismic event. In one or more embodiments, the seismic wave records include seismic wave traces of amplitude versus time for sensed seismic waves. Block 23 calls for identifying seismic events from the received seismic wave records using the processor, each identified seismic event having a location and magnitude. In general, each seismic wave record includes the seismic wave traces for an identified seismic event. The term "seismic events" is inclusive of seismic events of various magnitudes to include "microseismic events" as referred to in the art. Various techniques known in the art, such as triangulation and amplitude analysis for example, can be used to estimate the location and magnitude of each of the seismic events. It can be appreciated that estimating the locations and magnitudes of seismic events is a complex endeavor, requiring the use of very experienced personnel to correctly distinguish the seismic events from all the man-made and natural vibrations that propagate at the earth surface. Even once the seismic events are correctly identified, further work needs to be done to determine its location at depth and magnitude.

Block 24 calls parameterizing the seismic wave records for each identified seismic event to provide a parameter describing each seismic wave record used to identify each seismic event using the processor. Non-limiting embodiments of the parameter include (1) time of first arrival seismic wave, (2) amplitude of the first arrival seismic wave, and (3) sign of the first arrival seismic wave. In one or more embodiments, the parameter is a set of parameters, which may include (1), (2) and (3) above. Parameterization is discussed in more detail further below. In one or more embodiments, only the P-waves are parameterized and used in the disclosed analysis methods and apparatuses. In one or more embodiments, parameterizing may include determining the parameter for a time window that starts at the beginning of the received wave and lasts for the duration of that wave. In one or more embodiments, the duration of the time window is about one hundredth of a second (i.e., ten miliseconds).

Block 25 calls for generating a reference seismic event data base having the identified seismic events and the parameter corresponding to each seismic wave record used to identify each seismic event using the processor. The seismic event data base includes the estimated location and magnitude of each seismic event in addition to the parameter or parameters obtained from the parameterizing of each of those seismic events.

Block 26 calls for sensing new seismic waves traveling through the subterranean field using the array of seismic receivers to provide new seismic wave records. Block 27 calls for receiving the new seismic wave records using the processor. Block 28 calls for calculating, using the processor, a similarity value for the new received seismic wave records with respect to each seismic event in the reference seismic event data base using the corresponding parameter to provide a plurality of similarity values, each similarity value representing a level of similarity between the new seismic wave records and one of the seismic events in the seismic event data base. This block may include parameterizing the new seismic wave records, similar to Block 24, to provide the parameter describing the new seismic wave records. Block 29 calls for identifying a maximum similarity value from any of the similarity values in the plurality of similarity values that meets or exceeds a similarity threshold value using the processor. Block 30 calls for identifying a new seismic event at a location of the seismic event in the reference seismic event data base corresponding to the maximum similarity value using the processor.

Block 31 calls for transmitting a signal to a user interface in response to identification of the new seismic event using the processor, the signal providing notification that the new seismic event has been identified. It can be appreciated that various actions resulting from the notification may be performed depending on the industrial site being monitored. One action includes continuously checking for an abnormal behavior. Non-limiting examples include: checking seismicity in an unusual area, or an area known to be potentially problematic; checking seismicity that develops a trend in time, for example increasing magnitudes, increased hourly rate of occurrence, or migration of the seismicity towards the surface of the earth or towards a problematic zone; and checking seismicity whose magnitude exceeds a significant threshold, for example the threshold above which the events start to be felt at the surface by the nearby population. If an abnormal condition is detected, examples of actions include: sending notification to on-call personnel to check the results manually and possibly contact the customer and contacting the customer through text, email, or communicate through the continuous update of a web site for him to take action. In one or more embodiments, the signal includes a virtual model of the subterranean field illustrating the location of the new seismic event.

Block 32 calls for modifying operation of equipment for developing or maintaining the subterranean field in response to identifying the new seismic event. In one or more embodiments, modifying operation of equipment includes decreasing an injection rate or extraction rate of fluid being injected into or extracted from a borehole penetrating the subterranean field using a controller configured to control a pump and/or flow control valve.

The method 20 may further include updating the reference seismic event data base with the identified new seismic event and corresponding parameter that describes the new seismic wave records.

Next, parameterization is discussed in more detail. In one or more embodiments, the parametrization includes just two numbers for each trace number i of an "old" event in the reference seismic event data base: (1) the time of arrival Ti of the first P-wave, as picked by the operator, and (2) the amplitude Ai of the P-wavelet at that trace. The amplitude Ai is a signed quantity.

Figure 3:
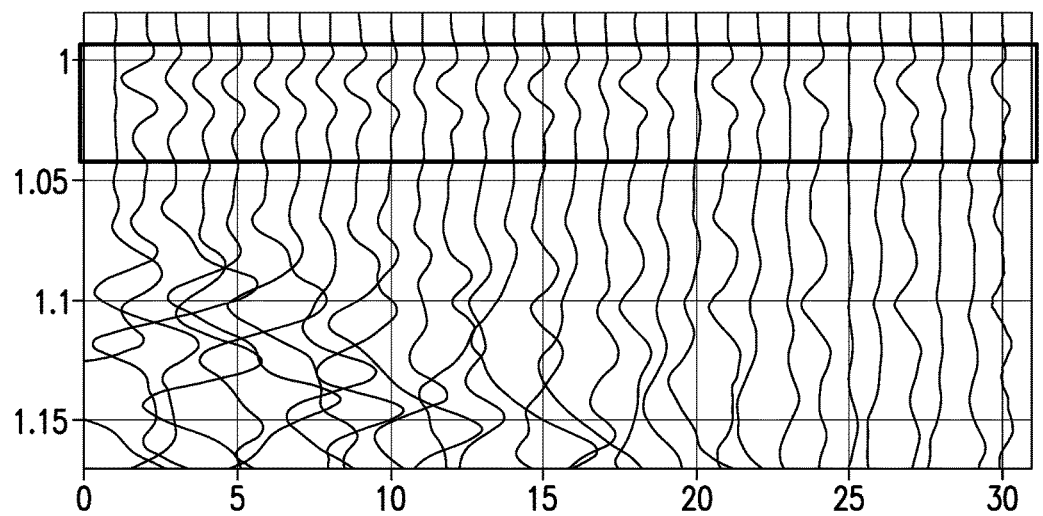
FIG. 3 depicts aspects of arrival of the P-wave on a set of seismic traces.
Figure 4A:
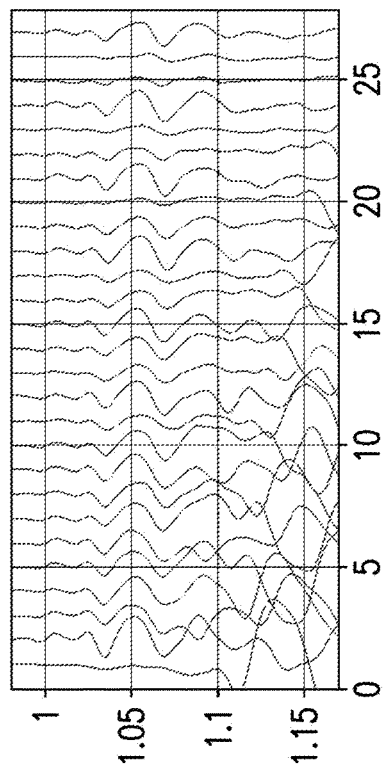
FIGS. 4A-4D, collectively referred to as FIG. 4, depict aspects of four micro-seismic events originating from the same location in the earth formation, in the vicinity of a cavern.
Figure 4C:
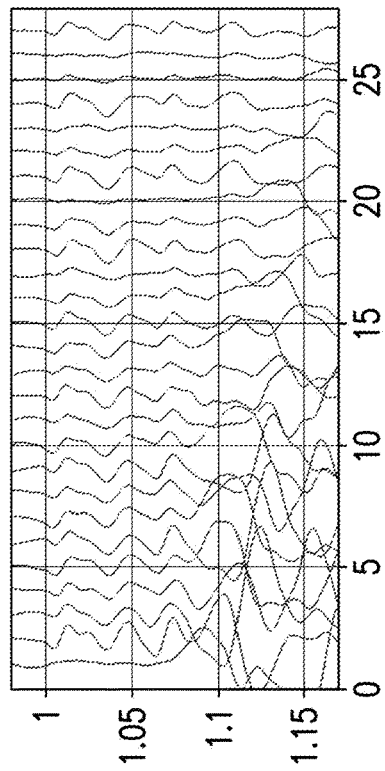
Figure 4B:
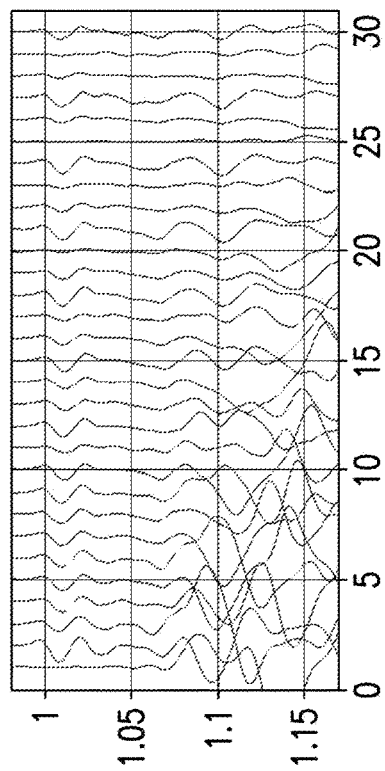
Figure 4D:
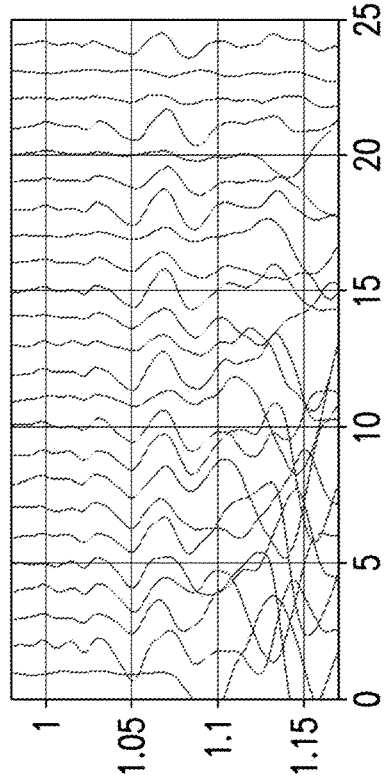

In one or more embodiments, one solution is to robustly evaluate the amplitude term in accordance with the following stages:

1. Select only the traces i for which the arrival time Ti of the P-wave can be measured.
2. On each trace i, consider a time window after Ti: constitute matrix M having N-traces×Ns where Ns is the number of time samples that corresponds to the window duration that was chosen. Matrix M should consist of mostly aligned P-waves as illustrated in the rectangle in FIG. 3. In FIG. 3, the arrival of the P wave on a set of traces is illustrated. The time picks of the P-wave have been used to align the P wave at t=1. The amplitude modulation is shown. Note that for the sake of clarity the signs have been corrected. The rectangle shows the P-wave signal matrix for the M matrix described above.
3. Cast the matrix M as the product of a vector of amplitudes Ai multiplied by a vector of waveform history S. S is a vector containing the time history of the P-wave signal that is repeated on the traces and has the same duration as the time window applied at the previous step. M [Ntraces×Ns]=A [Ntraces]×S [Ns], and A is the vector of the signed amplitude coefficients.
4. One way to decompose the matrix M, which is optimum in the least-squares sense, is to use a decomposition in singular values (SVD=singular values decomposition). The highest singular value gives the approximation of A and S.
5. The waveform history S can be discarded as it is not part of the parametrization.
6. Optionally, the results A and S can be used to refine the time picks that are sometimes approximate. The procedure includes the following:
   (a) For each trace, after stage 5, compute its correlation with the approximated signal S. The time at which the correlation is maximum is the time that the trace has to be further shifted with respect to the initial time pick; and
   (b) Once all the residual time corrections have been computed and applied, redo the singular values decomposition, to obtain an improved approximation $M_{impr}$ and $S_{impr}$ of the amplitude coefficients and event waveform history.

The optional stage 6 has been found to improve the rate of detection by 15%.

In the embodiment of this implementation, two seismic events that have the same location and same focal mechanism but different waveform histories will have the same parametrization. This is an advantage, as it means that a single event in the reference event data base can be used to detect the two different events.

Note that the amplitudes are computed for all the traces. With three-component receivers (i.e., receivers sensing ground motion in all three orthogonal axes such as up-down, north-south and east-west), it means that each trace contains the information on the inclination and azimuth of the sensed P-wave ray. This information, combined with the time of arrival, is sufficient to constrain the position of the new events.

Further, note the extreme conciseness of the parametrization: just two numbers are required for each trace. This allows an abundant number of reference (i.e., "old") seismic event parameters to be inserted in the reference seismic event data base.

Next, the similarity criterion between a record of new seismic wave traces and a reference event from the reference seismic event data base is discussed in more detail. The reference event is parametrized by (Ti,Ai) the arrival times and amplitudes at each of its seismic wave traces. The record is simply a collection of seismic traces Ri(t) where i spans the trace number and t is the time sample index.

One embodiment of the similarity criterion is as follows:

$$\text{Similarity}(t) = \frac{\left[\sum_i^N Ai * Ri(t-Ti)\right]^2}{\sum_i^N Ai^2 * \sum_i^N Ri(t-Ti)^2}.$$

Looking at the formula, it appears that the traces are first moved back in time with respect to the arrival times of the reference seismic event. If the record is a new microseismic event, and if it comes from the same place as the reference event, then this will result in the P-wave signal of the new event being aligned. Now suppose that the new event has the same amplitude distribution as the reference seismic event, then $Ri=Ai*s(t+Ti)$, where $s(t)$ is the waveform history of the new event. By injecting this equation in the expression, one finds that the similarity equals 1. Critically, the waveform history of the new event, $s(t)$ does NOT have to be the same as $S(t)$, the waveform history of the reference event. It means that a "wiggly event" can be used to detect a "spiky event".

In all the other cases, the similarity will be less than 1: if the record is not an event, if it is an event from another place and therefore with different Ti's, or if it is an event from the same place but with different Ai's. Note that the last case is actually rare: if an event is from the same place as a reference event, then it shares the same ray paths between the event position and the receivers. Therefore, the rays have the same inclination and azimuth. The only reason for the Ai's to differ is if the two events have different moment tensors or focal mechanisms, one being a normal faulting mechanism and one strike-slip for example. Experience has shown that all events from a given position always share the same focal mechanism, but with potentially different waveform histories. In FIG. 4 for example, a single reference seismic event can be used to detect all the four events shown. FIG. 4 illustrates seismic wave records of four microseismic events originating from the same location. The vertical axes are time in seconds, the horizontal axis trace number. The records are from three-component seismographs. Traces 1 to 3, 4 to 6, 7 to 9, etc . . . are from the same three-component seismometers (i.e., three-component seismic receivers). The traces have been moved-out (i.e., translated back in time) so that the picked arrival times of the P-wave are aligned with the 1 second tick.

Going back to the expression of the similarity, if the record is not an event, on the contrary, or an event from another place and therefore with different Ti's, or an event from the same place but with different Ai's, then the similarity will be less than 1.

It should be noted that due to the few parameters used in the similarity criterion equation, the similarity criterion equation is quick to compute and can thus be computed in real time.

If the similarity is high, then the record contains a new event similar to the reference event. In particular the new event has the same position as the reference event. As the similarity criterion has been designed to be independent on the magnitude though, the magnitude of the new event is unknown at this point.

Next, determining the magnitude of new seismic events is discussed. One procedure for determining the magnitude of a new seismic event is the following:
  (a) Apply the stages 1 to 7 discussed above to determine the Amplitude coefficients of the new seismic event, ANEWi. In that procedure, use the arrival times Ti of the reference event that was found most similar to the new event;
  (b) The magnitude of the new event is obtained from the magnitude of the reference event (which has been inserted in the data base), and from the ratio of the amplitude coefficients through:

$M\text{new}=M\text{referenceevent}+\alpha*\log(ANEWi/Ai)$;

(c) Where $\alpha$ is a coefficient that has to be fitted with events of known Magnitude; and
  (d) $\log(ANEWi/Ai)$ represents the ratio of amplitudes but is not strictly speaking a single number since there are as many amplitude coefficients as there are traces. In the actual computation it is replaced with $\log(\beta)$ where $\beta$ is the best fitting ratio between the ANEWi's and the Ai's in the least square sense, as in $$\beta = \frac{\sum_i A_i ANEW_i}{\sum_i A_i^2}.$$

It can be appreciated that due to the few parameters required for the parameterization of the seismic events in the reference seismic event data base, and the simplicity of the similarity criterion, the operations are very quick and can be performed in real time. The operations performed in real time include the following:
  1. For each new record having N traces Ri(t):
     i. For each reference event number n in the data base,
     ii. Compute the similarity Similarity(t) between the event n and the records, and
     iii. Compute the maximum over t of Similarity(t), Sn.
  2. Compute the maximum over n of Sn. In other words, identify the event that is most similar to the record.
  3. If the maximum of similarity Sn exceeds a predefined threshold:
     i. The present record contains a new event;
     ii. Its position is equal to the position of the reference event for which the similarity is maximum, i.e., the best-fitting reference event;
     iii. Compute the magnitude of the new event from the magnitude of the best-fitting reference event using a procedure as described above for "determining the magnitude of new seismic events; and
     iv. Add the new seismic event's time of occurrence, position and magnitude to the current list of seismic events in the reference seismic event data base.

The seismic monitoring methods and apparatuses disclosed herein provide several advantages over those in the prior art, for automatically monitoring industrial areas. Prior art seismic monitoring is susceptible to strong anthropogenic noise, which makes the received seismic waves complicated, and to phase overlap due to seismic waves propagating over short distances so that different phases overlap and the time picking thus becomes problematic. In contrast the methods and apparatuses disclosed herein for seismic monitoring of industrial sites are robust with respect to noise and are able to cope with overlapping and complex seismic wave signals. This makes the invention robust and reliable. In addition, the disclosed seismic monitoring is fast enough to analyze the seismic records continuously and in real time, providing core information about new seismic events in a timely manner and, thus, providing more time for mitigating actions to take place. It can be appreciated that if only total records or raw data of seismic traces were stored in the seismic event data base, then very few records could be stored in order to provide real time processing resulting in a too small data base. With total records or raw data stored, cross-correlation may then be used for a similarity criterion. Then, as the correlation compares the waveforms, an event in the data base will only detect a new event with the same exact source function, i.e., a "wiggly event" cannot be used to detect a "spiky event" originating from the same place.

Finally the correlation process can be disturbed by noise, so that the similarity criterion fails when either the old or the new seismic event has less than a needed perfect signal to noise ratio.

The disclosed seismic monitoring methods and apparatus can be useful in the following situations: (a) when the industrial activity can induce strong seismicity potentially felt at the surface and disturbing neighbors (this can be the case when injecting waste water in disposal wells, or hydraulically stimulating hydrocarbon producing wells in tight formations); (b) when the industrial activity induces seismicity that potentially damages the operator's surface installations or wells (this can be the case when producing hydrocarbons from a highly depleted reservoir; and (c) when the seismicity is a potential warning that an abnormal condition is about to occur (examples of this include the partial collapse of a cavity or the creation of a sinkhole that are usually preceded by an increase in seismicity, both in terms of event hourly rate and in terms of magnitude).

The occurrence of seismicity is mostly unpredictable, and since most of the reasons for monitoring it include preventing damage and additional cost, there is a high value in performing the monitoring day and night, permanently without the significant expense of keeping experienced staff on duty around the clock.

Embodiment 1. A method for developing or maintaining a subterranean field, the method comprising: receiving seismic wave records using a processor, the seismic wave records comprising information that identifies seismic events and a location and magnitude of each identified seismic event; parameterizing the seismic wave records for each identified seismic event to provide a parameter describing each seismic wave record used to identify each seismic event using the processor; generating a reference seismic event data base comprising the identified seismic events and the parameter corresponding to each seismic wave record used to identify each seismic event using the processor; calculating, using the processor, a similarity value for new received seismic wave records with respect to each seismic event in the reference seismic event data base using the corresponding parameter to provide a plurality of similarity values, each similarity value representing a level of similarity between the new seismic wave records and one of the seismic events in the reference seismic event data base; identifying a maximum similarity value from any of the similarity values in the plurality of similarity values that meets or exceeds a similarity threshold value using the processor; identifying a new seismic event at a location of the seismic event in the reference seismic event data base corresponding to the maximum similarity value using the processor; and modifying operation of equipment for developing or maintaining the subterranean field in response to identifying the new seismic event.

Embodiment 2. The method according to any prior embodiment, wherein the subterranean field comprises a cavern configured to store hydrocarbons.

Embodiment 3. The method according to any prior embodiment, further comprising: sensing seismic waves traveling through the subterranean field using an array of seismic receivers to provide the seismic wave records; receiving the seismic wave records using the processor; sensing new seismic waves traveling through the subterranean field using the array of seismic receivers to provide the new seismic wave records; and receiving the new seismic wave records using the processor.

Embodiment 4. The method according to any prior embodiment, further comprising transmitting a signal to a user interface in response to identification of the new seismic event using the processor, the signal comprising notification that the new seismic event has been identified.

Embodiment 5. The method according to any prior embodiment, wherein the parameter comprises a set of parameters that includes a time of arrival, an amplitude, and a sign of a received seismic wave.

Embodiment 6. The method according to any prior embodiment, further comprising calculating a magnitude of the new seismic event using the magnitude of the seismic event in the reference seismic event data base corresponding to the maximum similarity value and a ratio of the amplitude of the seismic event in the seismic event data base having the maximum similarity value to the amplitude of the new seismic event.

Embodiment 7. The method according to any prior embodiment, further comprising adding the magnitude of the seismic event in the reference seismic event data base corresponding to the maximum similarity value to a correction factor to provide the magnitude of the new seismic event.

Embodiment 8. The method according to any prior embodiment, wherein calculating a magnitude comprises solving the following equation:

$$Mnew = Mreferenceevent + \alpha * \log(\beta) \text{ where } \beta = \frac{\sum_i A_i ANEW_i}{\sum_i A_i^2},$$

Mnew is the magnitude of the new seismic event, Mreferenceevent is the magnitude of the seismic event in the reference seismic event data base corresponding the maximum similarity value, a is a coefficient that has to be fitted with seismic events of known magnitude, Ai is an amplitude of the parameterized i-seismic wave in the reference seismic event data base, and ANEWi is an amplitude of the i-new seismic wave in the new seismic wave records resulting from the new seismic event at the location of the seismic event having the parameter Ai in the reference seismic event data base.

Embodiment 9. The method according to any prior embodiment, wherein the signal comprises a virtual model of the subterranean field illustrating the location of the new seismic event and the magnitude of the new seismic event.

Embodiment 10. The method according to any prior embodiment, wherein calculating a similarity value comprises solving the following equation:

$$Similarity(t) = \frac{\left[\sum_i^N Ai * Ri(t - Ti)\right]^2}{\sum_i^N A i^2 * \sum_i^N Ri(t - Ti)^2}$$

where N is a number of seismic wave traces in the seismic event data base, t is a time sample index, Ti is an arrival time of a parameterized i-seismic wave in the reference seismic event data base, Ai is an amplitude of the parameterized i-seismic wave in the reference seismic event data base, and Ri is a record of the i-seismic trace of the new seismic waves.

Embodiment 11. The method according to any prior embodiment, wherein modifying operation of equipment comprises decreasing an injection rate or extraction rate of fluid being injected into or extracted from a borehole penetrating the subterranean field.

Embodiment 12. An apparatus for developing or maintaining a subterranean field, the apparatus comprising: an array of seismic receivers configured to sense seismic waves traveling through the subterranean field to provide seismic wave records comprising information that identifies seismic events and a location and magnitude of each identified seismic event; a processor configured to: receive the seismic wave records; parameterize the seismic wave records for each identified seismic event to provide a parameter describing each seismic wave record used to identify each seismic event; generate a reference seismic event data base comprising the identified seismic events and the parameter corresponding to each seismic wave record used to identify each seismic event; sense new seismic waves traveling through the subterranean field using the array of seismic receivers to provide new seismic wave records; receive the new seismic wave records; calculate a similarity value for new received seismic wave records with respect to each seismic event in the reference seismic event data base using the corresponding parameter to provide a plurality of similarity values, each similarity value representing a level of similarity between the new seismic wave records and one of the seismic events in the reference seismic event data base; identify a maximum similarity value from any of the similarity values in the plurality of similarity values that meets or exceeds a similarity threshold value; identify a new seismic event at a location of the seismic event in the reference seismic event data base corresponding to the maximum similarity value; and transmit a signal to a user interface in response to identification of the new seismic event using the processor, the signal comprising notification that the new seismic event has been identified; equipment configured to have modified operation in order to develop or maintain the earth formation in response to identification of the new seismic event.

Embodiment 13. The apparatus according to any prior embodiment, wherein the subterranean field comprises a cavern configured to store hydrocarbons.

Embodiment 14. The apparatus according to any prior embodiment, wherein the parameter comprises a set of parameters that includes a time of arrival, an amplitude, and a sign of a received seismic wave.

Embodiment 15. The apparatus according to any prior embodiment, wherein the equipment comprises a controller in communication with the signal and coupled to at least one of a pump and a flow control valve in order to control a flow rate of fluid injected into the subterranean field or produced from the subterranean field.

Embodiment 16. The apparatus according to any prior embodiment, wherein the controller is configured to decrease the flow rate.

Embodiment 17. The apparatus according to any prior embodiment, wherein the processor is further configured to calculate a magnitude of the new seismic event using the magnitude of the seismic event in the seismic event data base corresponding to the maximum similarity value and a ratio of the amplitude of the seismic event in the seismic event data base having the maximum similarity value to the amplitude of the new seismic event.

Embodiment 18. The apparatus according to any prior embodiment, wherein the processor is further configured to solve the following equation:

$$M\text{new} = M\text{referenceevent} + \alpha * \log(\beta) \text{ where}$$

$$\beta = \frac{\sum_i A_i ANEW_i}{\sum_i A_i^2},$$

Mnew is the magnitude of the new seismic event, Mreferenceevent is the magnitude of the seismic event in the reference seismic event data base corresponding the similarity value, $\alpha$ is a coefficient that has to be fitted with seismic events of known magnitude, Ai is an amplitude of the parameterized i-seismic wave in the reference seismic event data base, and ANEWi is an amplitude of the i-new seismic wave in the new seismic wave records resulting from the new seismic event at the location of the seismic event having the parameter Ai in the reference seismic event data base.

Embodiment 19. The apparatus according to any prior embodiment, wherein the processor is further configured to solving the following equation in order to calculate the similarity value:

$$\text{Similarity}(t) = \frac{\left[\sum_i^N A_i * R_i(t - T_i)\right]^2}{\sum_i^N A_i^2 * \sum_i^N R_i(t - T_i)^2}$$

where N is a number of seismic wave traces in the seismic event data base, t is a time sample index, Ti is an arrival time of a parameterized i-seismic wave in the reference seismic event data base, Ai is an amplitude of the parameterized i-seismic wave in the seismic event data base, and Ri is a record of the i-seismic trace of the new seismic waves.

In support of the teachings herein, various analysis components may be used, including a digital and/or an analog system. For example, the controller 6, the computer processing system 9, and/or the array or seismic receivers 12 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), sensor, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for developing or maintaining a subterranean field, the method comprising:
   receiving first seismic wave records using a processor, the first seismic wave records comprising information that identifies first seismic events and a location and magnitude of each identified first seismic event;
   parameterizing the first seismic wave records for each identified first seismic event to provide a parameter describing each first seismic wave record used to identify each first seismic event using the processor;
   generating a reference seismic event data base comprising the identified first seismic events and the parameter corresponding to each first seismic wave record used to identify each first seismic event using the processor;
   calculating, using the processor, a similarity value for second received seismic wave records with respect to each seismic event in the reference seismic event data base using the corresponding parameter to provide a plurality of similarity values, each similarity value representing a level of similarity between the second seismic wave records and one of the seismic events in the reference seismic event data base, wherein the second received seismic wave records are received after the first seismic wave records;
   identifying a maximum similarity value from any of the similarity values in the plurality of similarity values that meets or exceeds a similarity threshold value using the processor;
   identifying a second seismic event at a location of the seismic event in the reference seismic event data base corresponding to the maximum similarity value using the processor; and
   modifying operation of equipment for developing or maintaining the subterranean field in response to identifying the second seismic event;
   transmitting a signal to a user interface in response to identification of the second seismic event using the processor, the signal comprising notification that the second seismic event has been identified;
   wherein the signal comprises a virtual model of the subterranean field illustrating the location of the second seismic event and the magnitude of the second seismic event.

2. The method according to claim 1, wherein the subterranean field comprises a cavern configured to store hydrocarbons.

3. The method according to claim 1, further comprising:
   sensing first seismic waves traveling through the subterranean field using an array of seismic receivers to provide the seismic wave records;
   receiving the first seismic wave records using the processor;
   sensing second seismic waves traveling through the subterranean field using the array of seismic receivers to provide the second seismic wave records; and
   receiving the second seismic wave records using the processor.

4. The method according to claim 1, wherein the parameter comprises a set of parameters that includes a time of arrival, an amplitude, and a sign of a received seismic wave.

5. The method according to claim 1, further comprising calculating a magnitude of the second seismic event using the magnitude of the seismic event in the reference seismic event data base corresponding to the maximum similarity value and a ratio of the amplitude of the seismic event in the seismic event data base having the maximum similarity value to the amplitude of the second seismic event.

6. A method for developing or maintaining a subterranean field, the method comprising:
   receiving first seismic wave records using a processor, the first seismic wave records comprising information that identifies first seismic events and a location and magnitude of each identified first seismic event;
   parameterizing the first seismic wave records for each identified first seismic event to provide a parameter describing each first seismic wave record used to identify each first seismic event using the processor;
   generating a reference seismic event data base comprising the identified first seismic events and the parameter corresponding to each first seismic wave record used to identify each first seismic event using the processor;
   calculating, using the processor, a similarity value for second received seismic wave records with respect to each seismic event in the reference seismic event data base using the corresponding parameter to provide a plurality of similarity values, each similarity value representing a level of similarity between the second seismic wave records and one of the seismic events in the reference seismic event data base, wherein the second received seismic wave records are received after the first seismic wave records;

identifying a maximum similarity value from any of the similarity values in the plurality of similarity values that meets or exceeds a similarity threshold value using the processor;

identifying a second seismic event at a location of the seismic event in the reference seismic event data base corresponding to the maximum similarity value using the processor;

modifying operation of equipment for developing or maintaining the subterranean field in response to identifying the second seismic event;

calculating a magnitude of the second seismic event using the magnitude of the seismic event in the reference seismic event data base corresponding to the maximum similarity value and a ratio of the amplitude of the seismic event in the seismic event data base having the maximum similarity value to the amplitude of the second seismic event; and adding the magnitude of the seismic event in the reference seismic event data base corresponding to the maximum similarity value to a correction factor to provide the magnitude of the second seismic event.

7. The method according to claim 6, wherein calculating a magnitude comprises solving the following equation:

$$Mnew = Mreferenceevent + \alpha * \log(\beta)$$

where $$\beta = \frac{\sum_i A_i ANEW_i}{\sum_i A_i^2},$$

Mnew is the magnitude of the second seismic event, Mreferenceevent is the magnitude of the seismic event in the reference seismic event data base corresponding the maximum similarity value, $\alpha$ is a coefficient that has to be fitted with seismic events of known magnitude, Ai is an amplitude of the parameterized i-seismic wave in the reference seismic event data base, and ANEWi is an amplitude of the i-new seismic wave in the second seismic wave records resulting from the second seismic event at the location of the seismic event having the parameter Ai in the reference seismic event data base.

8. The method according to claim 1, wherein calculating a similarity value comprises solving the following equation:

$$\text{Similarity}(t) = \frac{\left[\sum_i^N Ai * Ri(t - Ti)\right]^2}{\sum_i^N Ai^2 * \sum_i^N Ri(t - Ti)^2}$$

where N is a number of seismic wave traces in the seismic event data base, t is a time sample index, Ti is an arrival time of a parameterized i-seismic wave in the reference seismic event data base, Ai is an amplitude of the parameterized i-seismic wave in the reference seismic event data base, and Ri is a record of the i-seismic trace of the second seismic waves.

9. The method according to claim 1, wherein modifying operation of equipment comprises decreasing an injection rate or extraction rate of fluid being injected into or extracted from a borehole penetrating the subterranean field.

10. An apparatus for developing or maintaining a subterranean field, the apparatus comprising:

an array of seismic receivers configured to sense first seismic waves traveling through the subterranean field to provide first seismic wave records comprising information that identifies first seismic events and a location and magnitude of each identified first seismic event and to sense second seismic waves traveling through the subterranean field to provide second seismic wave records comprising information that identifies second seismic events and a location and magnitude of each identified second seismic event, wherein the second seismic waves are sensed after the first seismic waves;

a processor configured to:
receive the first seismic wave records;
parameterize the first seismic wave records for each identified first seismic event to provide a parameter describing each first seismic wave record used to identify each first seismic event;
generate a reference seismic event data base comprising the identified first seismic events and the parameter corresponding to each first seismic wave record used to identify each first seismic event;
receive the second seismic wave records;
calculate a similarity value for the received second seismic wave records with respect to each seismic event in the reference seismic event data base using the corresponding parameter to provide a plurality of similarity values, each similarity value representing a level of similarity between the second seismic wave records and one of the seismic events in the reference seismic event data base;
identify a maximum similarity value from any of the similarity values in the plurality of similarity values that meets or exceeds a similarity threshold value;
identify a second seismic event at a location of the seismic event in the reference seismic event data base corresponding to the maximum similarity value; and
transmit a signal to a user interface in response to identification of the second seismic event using the processor, the signal comprising notification that the second seismic event has been identified;
calculate a magnitude of the second seismic event using the magnitude of the seismic event in the seismic event data base corresponding to the maximum similarity value and a ratio of the amplitude of the seismic event in the seismic event data base having the maximum similarity value to the amplitude of the second seismic event;
solve the following equation:

$$Mnew = Mreferenceevent + \alpha * \log(\beta)$$

where $$\beta = \frac{\sum_i A_i ANEW_i}{\sum_i A_i^2},$$

Mnew is the magnitude of the second seismic event, Mreferenceevent is the magnitude of the seismic event in the reference seismic event data base corresponding the maximum similarity value, $\alpha$ is a coefficient that has to be fitted with seismic events of known magnitude, Ai is an amplitude of the parameterized i-seismic wave in the reference seismic event data base, and ANEWi is an amplitude of the i-new seismic wave in the second seismic wave records resulting from the second seismic event at the location of the seismic event having the parameter Ai in the reference seismic event data base;

equipment configured to have modified operation in order to develop or maintain the earth formation in response to identification of the second seismic event.

11. The apparatus according to claim 10, wherein the subterranean field comprises a cavern configured to store hydrocarbons.

12. The apparatus according to claim 10, wherein the parameter comprises a set of parameters that includes a time of arrival, an amplitude, and a sign of a received seismic wave.

13. The apparatus according to claim 10, wherein the equipment comprises a controller in communication with the signal and coupled to at least one of a pump and a flow control valve in order to control a flow rate of fluid injected into the subterranean field or produced from the subterranean field.

14. The apparatus according to claim 13, wherein the controller is configured to decrease the flow rate.

15. The apparatus according to claim 10, wherein the processor is further configured to solving the following equation in order to calculate the similarity value:

$$\text{Similarity}(t) = \frac{\left[\sum_i^N Ai * Ri(t - Ti)\right]^2}{\sum_i^N Ai^2 * \sum_i^N Ri(t - Ti)^2}$$

where N is a number of seismic wave traces in the seismic event data base, t is a time sample index, Ti is an arrival time of a parameterized i-seismic wave in the reference seismic event data base, Ai is an amplitude of the parameterized i-seismic wave in the seismic event data base, and Ri is a record of the i-seismic trace of the second seismic waves.

* * * * *